(12) United States Patent
Kawakami et al.

(10) Patent No.: US 7,685,351 B2
(45) Date of Patent: Mar. 23, 2010

(54) EXTERNAL DEVICE ACCESS APPARATUS

(75) Inventors: Takao Kawakami, Osaka (JP);
Masaitsu Nakajima, Osaka (JP);
Tokuzo Kiyohara, Osaka (JP);
Hiroyuki Morishita, Osaka (JP); Nobuo Higaki, Hyogo (JP); Yousuke Kudo, Osaka (JP)

(73) Assignee: Panasonic Corporation, Osaka (JP)

( * ) Notice: Subject to any disclaimer, the term of this patent is extended or adjusted under 35 U.S.C. 154(b) by 35 days.

(21) Appl. No.: 11/916,319

(22) PCT Filed: Jun. 6, 2006

(86) PCT No.: PCT/JP2006/311337

§ 371 (c)(1),
(2), (4) Date: Dec. 3, 2007

(87) PCT Pub. No.: WO2006/134804

PCT Pub. Date: Dec. 21, 2006

(65) Prior Publication Data

US 2009/0037779 A1    Feb. 5, 2009

(30) Foreign Application Priority Data

Jun. 15, 2005    (JP) .............................. 2005-175677

(51) Int. Cl.
*G06F 13/00* (2006.01)
(52) U.S. Cl. ......................................... 710/310; 710/52
(58) Field of Classification Search .................. 710/52, 710/54, 55, 306, 310, 308, 313
See application file for complete search history.

(56) References Cited

U.S. PATENT DOCUMENTS

| | | | | |
|---|---|---|---|---|
| 4,884,264 | A | * | 11/1989 | Servel et al. ................ 370/422 |
| 5,524,270 | A | * | 6/1996 | Haess et al. ................. 710/310 |
| 5,768,548 | A | | 6/1998 | Young et al. |
| 5,822,779 | A | | 10/1998 | Intrater et al. |
| 5,838,677 | A | * | 11/1998 | Kozaki et al. ............... 370/389 |
| 6,366,973 | B1 | | 4/2002 | Lo et al. |
| 6,434,643 | B1 | | 8/2002 | Ejiri |
| 6,546,451 | B1 | * | 4/2003 | Venkataraman et al. ..... 710/317 |

(Continued)

FOREIGN PATENT DOCUMENTS

CN    1236134 A    11/1999

(Continued)

OTHER PUBLICATIONS

English language Abstract and partial translation of JP 6-110823.

(Continued)

*Primary Examiner*—Glenn A Auve
(74) *Attorney, Agent, or Firm*—Greenblum & Bernstein, P.L.C.

(57) ABSTRACT

In response to a write request from a master to write to an external device, a control unit holds a write address and write data from the master in a write address holding unit and in a write data holding unit, respectively, outputs a reception signal to the master, and writes the write data to the external device specified by the write address. When the master holds the read address in the read address holding unit, the control unit reads data from the external device specified by the read address, and holds the read data in the read data holding unit.

6 Claims, 9 Drawing Sheets

U.S. PATENT DOCUMENTS

| | | | |
|---|---|---|---|
| 7,127,544 B2 * | 10/2006 | Kawaguchi | 710/306 |
| 2002/0156947 A1 | 10/2002 | Nishio | |
| 2003/0093604 A1 | 5/2003 | Lee | |
| 2004/0268009 A1 * | 12/2004 | Shin et al. | 710/310 |
| 2005/0273537 A1 * | 12/2005 | Harris et al. | 710/110 |
| 2008/0034127 A1 | 2/2008 | Nishio | |

FOREIGN PATENT DOCUMENTS

| | | |
|---|---|---|
| JP | 5-12190 | 1/1993 |
| JP | 5-012190 | 1/1993 |
| JP | 6-110823 | 4/1994 |
| JP | 7-006151 | 1/1995 |
| JP | 2003-6133 | 1/2003 |
| JP | 2004-252580 | 9/2004 |

OTHER PUBLICATIONS

English language Abstract and partial translation of JP 5-012190.
English language Abstract of JP 7-006151.
English language Abstract and translation of Paragraph No. [0005] of JP 6-110823, Apr. 22, 1994.
English language Abstract and translation of Paragraph Nos. [0026], [0027] and [0031] of JP 2004-252580, Sep. 9, 2004.
English language Abstract of JP 2003-6133, Jan. 10, 2003.

* cited by examiner

EXTERNAL DEVICE ACCESS APPARATUS

TECHNICAL FIELD

The present invention relates to access to an external device from a master in a system LSI, and particularly to an external device access apparatus which allows a master to easily expand an external device and be not dependent on the type of the external device when expanding.

BACKGROUND ART

With media processing, there are cases where it is effective to assist a master with an external device, and for expanding the external device, an expansion bus is provided with the master.

Here, the media processing refers to data processing in general, such as audio processing and image processing, the master refers to a device such as a CPU, a microcomputer and the like which performs main control, and the external device refers to a peripheral device such as a coprocessor, an accelerator, a memory and the like which assists the CPU, the microcomputer and the like.

By having the expansion bus and having resources of the external device assigned to the access space, the master can handle the resources of the external device as expanded resources of the master, and thus communication between the master and the external device can be performed at a high speed. As a result, the processing performance of the master can be improved, and it is further possible to facilitate realization of functions of both software and hardware.

Here, the access space is space to which the master can access and to which addresses are assigned for a program access, a data access, an input/output access and the like.

Conventional methods of realizing these accesses include a method where a master is provided with an interface of an expansion bus and accesses an on-chip device via the interface, and further, a method of accessing an external device outside the chip via the interface of the expansion bus of a master and another interface by converting into a protocol of the expansion bus. (See, for example, Patent Reference 1)

Patent Reference 1: Japanese Unexamined Patent Application Publication No. 076151 (p. 15, FIG. 3)

DISCLOSURE OF INVENTION

Problems that Invention is to Solve

In the case of, for example, enhancing the speed of the master following an enhancement in the speed of the media processing in customizing the system LSI, the conventional methods require optimization of the master itself for each external device in order to be accessible to the external devices having different operation speeds, and this causes a problem that the customization of the system LSI becomes complicated.

Further, in the case where the optimization of each external device is not performed in the master itself, there is a problem that the performance of the master comes under the significant impact of a penalty for an access latency in accessing the external device, a throughput and the like that become a bottleneck.

Furthermore, in order to perform the optimization of each external device in the master itself, a need to alter the master itself arises every time a new external device which is compatible with new media processing is required and every time the external device is altered due to a failure of the device, for example. Thus, this causes a problem of generating a tremendous loss in terms of development resources which are to be effectively used.

The present invention has an object to provide an external device access apparatus and a system LSI which do not cause deterioration in the access performance of the master in accessing the external device even without optimization of the master itself and which allow effective use of the development resources of the system LSI.

Means to Solve the Problems

In order to solve the above described problems, the external device access apparatus according to the present invention is an external device access apparatus which controls access from a master to an external device, the external device access apparatus including: a write address holding unit which holds a write address in response to a write request from the master to write to the external device; a write data holding unit which holds write data in response to the write request; a read address holding unit which holds a read address and which can be accessed from the master; a read data holding unit which holds data read from the external device and which can be accessed from the master; and a control unit which controls the access to the external device in response to: the write request or a read request from the master; and an address specified by the master. In response to the write request from the master to write to the external device, the control unit: holds the write address and the write data from the master in the write address holding unit and in the write data holding unit, respectively; outputs a reception signal to the master; and writes the write data to the external device specified by the write address. When the master holds the read address in the read address holding unit, the control unit reads data from the external device specified by the read address, and holds the read data in the read data holding unit.

With this structure, in the case of enhancing the speed of the master following an enhancement in the speed of the media processing, there is an effect of reducing an impact on the performance of the master by realizing access which is not dependent on a status of the master at the time of requesting write or read, and concealing an access penalty for accessing the external device, when accessing the external devices having different operation speeds.

Further, there is an effect that the access to the external device can be easily optimized by adjusting the resources of the external device access apparatus in accordance with the external devices.

Furthermore, by providing the external device access apparatus in order for the master to access the external device in the system LSI, the need to alter the master every time the system LSI is developed is eliminated and thus only the external device access apparatus needs to be altered. Therefore, it is possible to significantly reduce the development cost for the master in the system LSI.

Here, the external device access apparatus may further include: a status signal holding unit which holds a status signal outputted from the external device, in which the control unit may: simultaneously write the data held in the write data holding unit to the external device, and hold the status signal outputted from the external device in the status signal holding unit; and simultaneously read the data from the external device specified by the address held in the read address holding unit so as to hold the read data in the read data holding unit, and hold the status signal outputted from the external device in the status signal holding unit, and the status signal holding unit outputs the held status signal to the master.

With this structure, there is further an effect that a function of transmitting the status of the external device is realized, which improves the performance of the master.

Here, the external device access apparatus may include an address/data holding unit which substitutes for both the read address holding unit and the read data holding unit.

With this structure, there is further an effect that the external device access apparatus can be made smaller because the read address holding unit and the read data holding unit do not need to be independently provided, which achieves a cost reduction.

Here, the external device access apparatus may further include an unimplemented information holding unit which holds unimplemented information that indicates whether or not one of the write address and the read address is an address of the external device which is unimplemented, in which the control unit further may: judge whether or not the external device, specified by one of the write address held in the write address holding unit and the read address held in the read address holding unit, is unimplemented; hold the unimplemented information in the unimplemented information holding unit when the external device is judged as unimplemented; and notify the master of the unimplemented information.

With this structure, there is further an effect of realizing a function of detecting the unimplemented external device by the read address or the write address, which improves the performance of the master.

Here, the external device access apparatus may further include an error address holding unit which holds, as an error address, an address of the external device which is unimplemented, in which the control unit further may: judge whether or not the external device, specified by one of the write address held in the write address holding unit and the read address held in the read address holding unit, is unimplemented; hold, as the error address, the address in the error address holding unit when the external device is judged as unimplemented; and notify the master of the error address.

With this structure, there is further an effect of realizing a function of detecting, by a specified address, that an arbitrary external device is not implemented and allowing the master to recognize the address, which improves the performance of the master.

Here, the control unit further may: judge whether or not the external device, specified by one of the write address held in the write address holding unit and the read address held in the read address holding unit, is unimplemented; hold, as an error address, the address in the read data holding unit when the external device is judged as unimplemented; and notify the master of the error address.

With this structure, there is an effect that the external device access apparatus can be made smaller because the error address holding unit does not need to be independently provided, which achieves a cost reduction.

Here, the external device access apparatus may further include a hold status holding unit which holds a hold status signal that indicates whether or not read from the external device to the read data holding unit is completed, in response to the write request from the master, in which the control unit may further restrict write from the master to the read address holding unit, based on the hold status signal.

With this structure, there is further an effect that by having the master which recognizes the hold status of the external device and holds an access request order of the master, the performance of the master is improved.

Further, the system LSI of the present invention includes the same units as the units described above.

Effects of the Invention

According to the present invention, in the case of enhancing the speed of the master following an enhancement in the speed of the media processing, there is an effect of reducing an impact on the performance of the master by realizing access which is not dependent on the status of the master at the time of requesting write or read and by concealing an access penalty for accessing the external devices, when accessing the external devices having different operation speeds.

Further, there is an effect that the access to the external device can be easily optimized by adjusting the resources of the external device access apparatus in accordance with the external devices.

Furthermore, by providing the external device access apparatus in the system LSI in order for the master to access the external device, the need to alter the master every time the system LSI is developed is eliminated and thus only the external device access apparatus needs to be altered. Therefore, there is an effect of significantly reducing the development cost for the master in the system LSI.

Moreover, there is an effect that a function of transmitting the status of the external device to the master is realized, which improves the performance of the master.

In addition, there is an effect of reducing the cost by making the external device access apparatus smaller, which improves the performance of the master.

NUMERICAL REFERENCES

Figure 1:
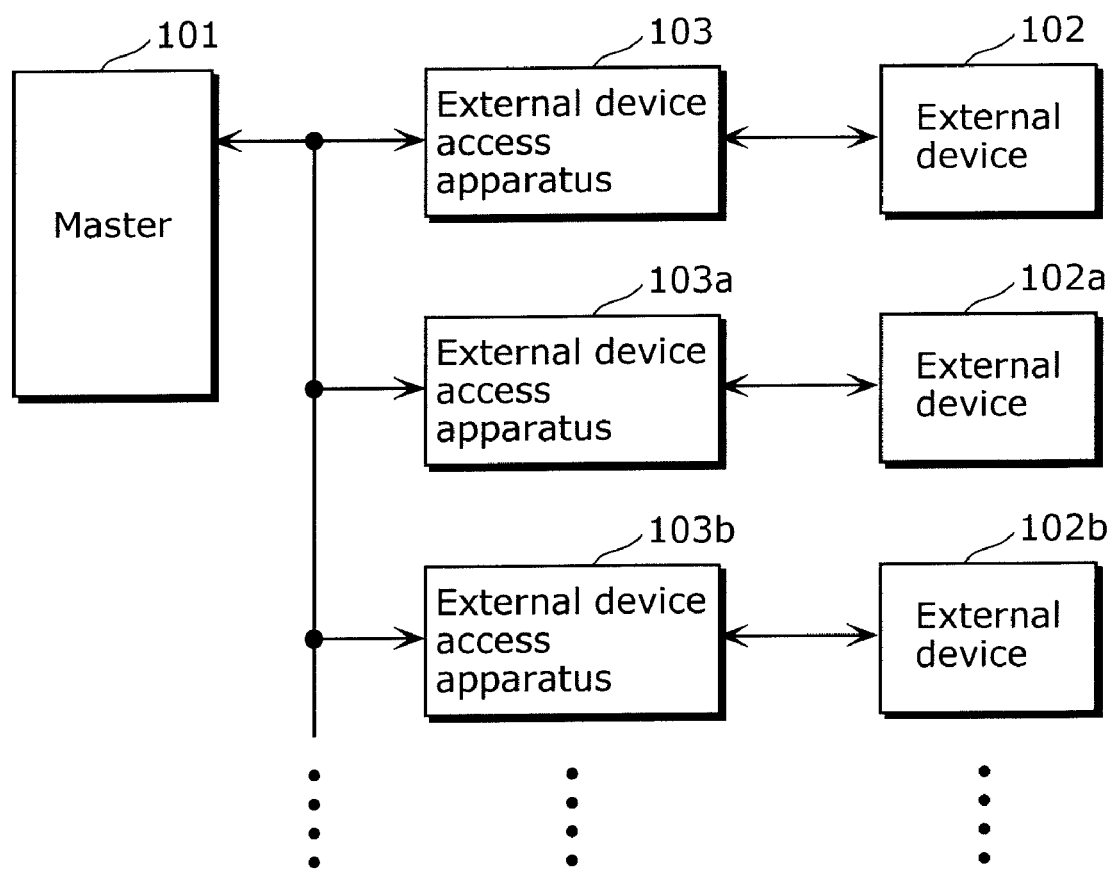
FIG. 1 is a block diagram showing a configuration of a system LSI according to a first embodiment.

101 Master
102 External device
103 External device access apparatus
110 Write address holding unit
111 Write data holding unit
112 Read address holding unit
113 Read data holding unit
114 Address control unit
150 Address bus 151 Write data input bus
152 Read data output bus
153 R/W signal bus
160 Write address
161 Write permission signal
162 Read address
163 Read address permission signal
164 Read data permission signal
170 Write address output bus
171 Write data input/output bus
172 Read address output bus
173 Read data input bus
215 Status signal holding unit
254 Status signal output bus
274 Status signal input bus
364 Read data holding unit control
365 Read address
372 Read address bus
415 Unimplemented information holding unit
454 Unimplemented information bus
465 Unimplemented information
515 Error address holding unit
554 Error address bus
565 Error address
664 Read data holding unit control
665 Error address
715 Hold status holding unit
765 Hold status

BEST MODE FOR CARRYING OUT THE INVENTION

Hereinafter, embodiments are provided on an assumption that: a master refers to a device such as a CPU, a microcomputer and the like which performs control of read and write; an external device refers to a device such as a coprocessor, an accelerator, and the like which assists the CPU, the microcomputer and the like; and the device has resources which are accessible from the master by specifying an address.

First Embodiment

With reference to the drawings, a description of an external device access apparatus according to a first embodiment of the present invention shall be provided.

FIG. 1 is a block diagram showing a configuration of a system LSI according to the first embodiment of the present invention. The system LSI includes a master 101, external devices 102, 102a, 102b . . . and external device access apparatuses 103, 103a, 103b . . . . In this example, the external device access apparatuses correspond to the external devices. The external device access apparatus 103 is configured in such manner that in response to a request from the master 101 to write to or read from the external device 102, access which is not dependent on the status of the master 101 is realized, and an access penalty on the master 101 for accessing the external device is concealed. The external device access apparatuses 103a, 103b . . . are also configured in the same manner.

Figure 2:
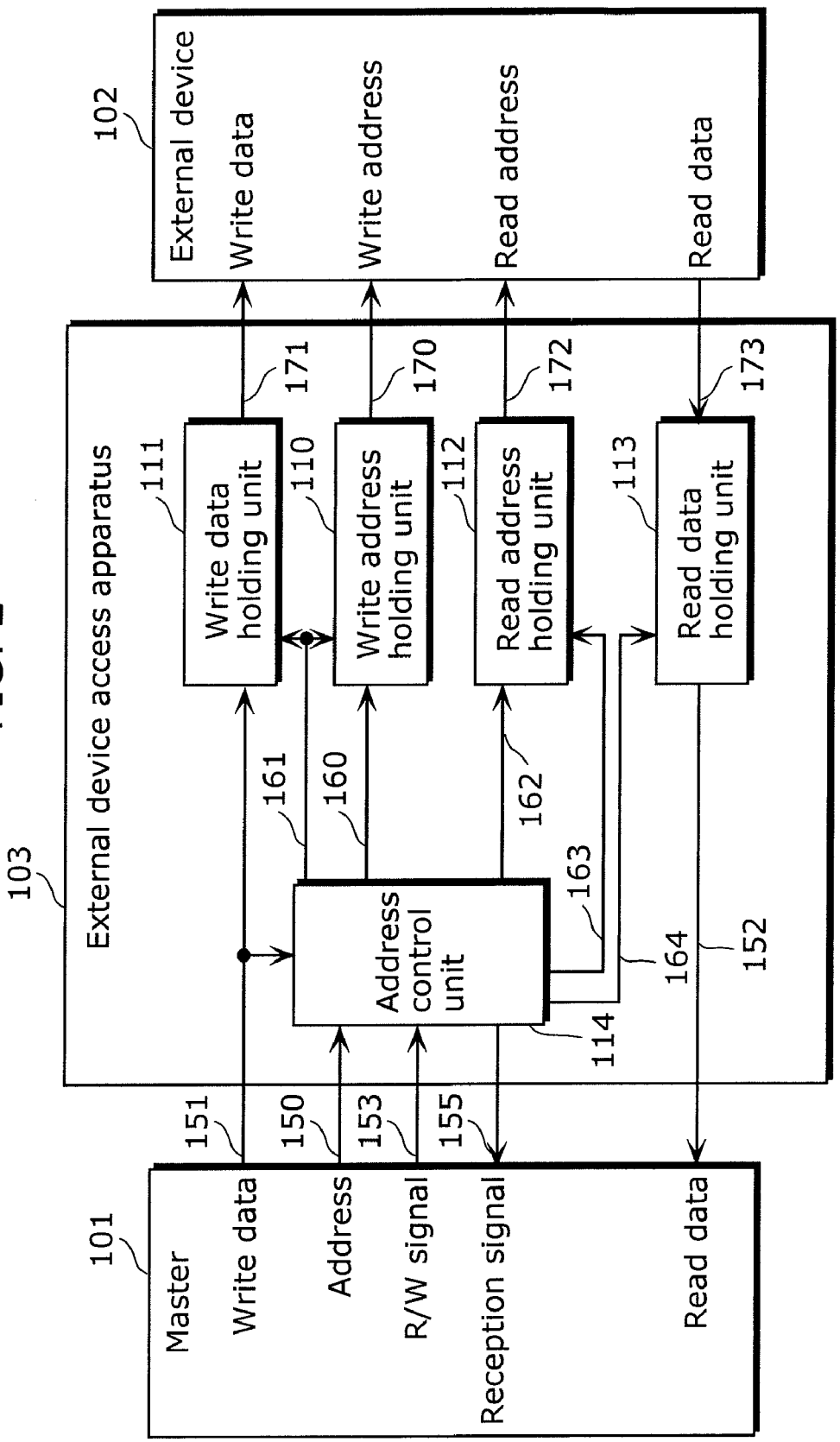
FIG. 2 is a block diagram showing a configuration of an external device access apparatus according to the first embodiment.

FIG. 2 is a block diagram showing a configuration of the external device access apparatus 103 according to the first embodiment of the present invention.

First, a configuration of the external device access apparatus 103 shall be described.

The external device access apparatus 103 is connected with the master 101 via: an address bus 150; a write data input bus 151; a read data output bus 152; a write/read control signal (hereinafter referred to as "R/W signal") bus 153; and a reception signal 155, and is also connected with the external device 102 via: a write address output bus 170; a write data output bus 171; a read address output bus 172; and a read data input bus 173.

Further, the external device access apparatus 103 includes a write address holding unit 110, a write data holding unit 111, a read address holding unit 112, a read data holding unit 113, and an address control unit 114.

The write address holding unit 110 receives a write address 160 and a write permission signal 161 from the address control unit 114, and outputs the held address to the external device 102.

The write data holding unit 111 receives write data from the master via the write data input bus 151 and the write permission signal 161 from the address control unit 114, and outputs the held data to the external device 102.

The read address holding unit 112 receives a read address 162 and a read address permission signal 163 from the address control unit 114, and outputs the held address to the external device 102.

The read data holding unit 113 receives read data from the external device via the read data input bus 173 and a read data permission signal 164 from the address control unit, and outputs the held data to the master 101.

Further, the read data holding unit 113 has an address assigned to the access space of the master 101.

The address control unit 114: receives an address from the master via the address bus 150, an R/W signal from the master via the R/W signal bus 153, and the write data from the master via the write data input bus 151; outputs the write address 160 and the write permission signal 161 to the write address holding unit 110; outputs the write permission signal 161 to the write data holding unit 111; outputs the read address 162 and the read address permission signal 163 to the read address holding unit 112; and outputs the read data permission signal 164 to the read data holding unit 113.

Next, operations of the external device access apparatus 103 shall be described.

The operations of the external device access apparatus 103 include a usual write operation, an operation of reading, in advance, data from the external device 102 to the read data holding unit 113, and an operation of outputting to the master the data read in advance to the read data holding unit 113. These operations are referred to as a usual write operation, a prefetch operation and a prefetched data read operation, respectively.

In the usual write operation, in response to the write request from the master 101, the address received via the address bus 150 and the R/W signal received via the R/W signal bus 153 are inputted to the address control unit 114 in the external device access apparatus 103.

Based on the R/W signal and on the basis that the address received via the address bus 150 is not an address assigned to the read data holding unit 113, the address control unit 114: recognizes the usual write operation; outputs the write address 160 and the write permission signal 161 to the write address holding unit 110 so that the address is held; and outputs the write permission signal 161 to the write data holding unit 111 so that the data received via the write data bus 151 is held.

The held address and data are kept until the external device accepts them, and when the acceptance is completed, the usual write operation is completed.

In the prefetch operation, in response to the write request from the master 101, the address received via the address bus 150, the R/W signal received via the R/W signal bus 153, and the data received via the write data bus 151 are inputted to the address control unit 114 in the external device access apparatus 103.

Based on the R/W signal and on the basis that the address received via the address bus 150 is an address assigned to the read data holding unit 113, the address control unit 114 recognizes the prefetch operation, and outputs the read address 162 and the read address permission signal 163 to the read address holding unit 112 so that the address is held, considering the data received via the write data bus 151 as the read address.

The external device 102 accepts the held address, and holds the address until the read data from the external device 102 is held in the read data holding unit 113. When the hold is completed, the prefetch operation is completed.

In the prefetched data read operation, in response to the read request from the master 101, the address received via the address bus 150 and the R/W signal received via the R/W signal bus 153 are inputted to the address control unit 114 in the external device access apparatus 103.

Based on the R/W signal and on the basis that the address received via the address bus 150 is an address assigned to the read data holding unit 113, the address control unit 114 recognizes the prefetched data read operation, and outputs the read data permission signal 164 to the read data holding unit 113 so as to output to the master 101 via the read data bus 152.

The read data is held until the master 101 accepts the read data, and when the acceptance is completed, the prefetched data read operation is completed.

An advantage of these operations is that since in the usual write operation, the write request from the master 101 is held by the external device access apparatus 103, the master 101 can complete the write and operate without having to wait for the acceptance by the external device, and thus the write to the external device 102 can be carried out without having to be dependent on the master 101.

Since in the prefetch operation, with use of the write request from the master 101, the operation of reading in advance the data of the external device 102 to the read data holding unit 113 is realized, and as in the usual write operation, the write request from the master 101 is held by the external device access apparatus 103 as the read request, the master 101 can complete the write and operate without having to wait for the acceptance by the external device, and thus the read from the external device 102 can be carried out without having to be dependent on the master 101.

In the prefetched data read operation, since, due to the read request from the master 101, the data which is read in advance to the read data holding unit 113 is outputted to the master 101, the read of the data can be carried out without having to be dependent on the external device 102.

Figure 3:
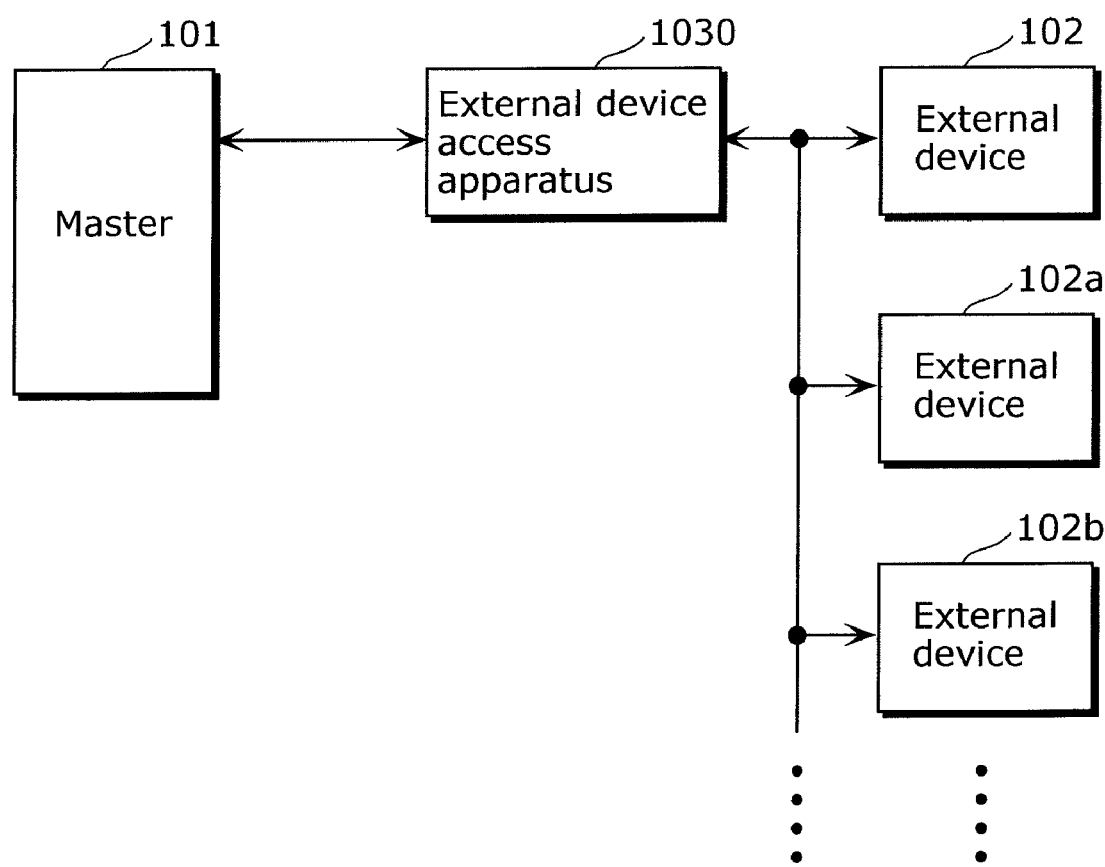
FIG. 3 is a block diagram showing a configuration of another system LSI according to the first embodiment.

Note that in the system LSI in FIG. 1, the external device access apparatuses and the external devices are in one-to-one correspondence, but they may be in one-to-many correspondence. FIG. 3 shows an exemplary configuration of the system LSI in such case. An external device access apparatus 1030 in FIG. 3 is configured in such manner as to: correspond to the access latency of each of the external devices; and conceal the access penalty on the master 101 for accessing each of the external devices.

Second Embodiment

With reference to the drawings, an external device access apparatus according to a second embodiment of the present invention shall be described.

Figure 4:
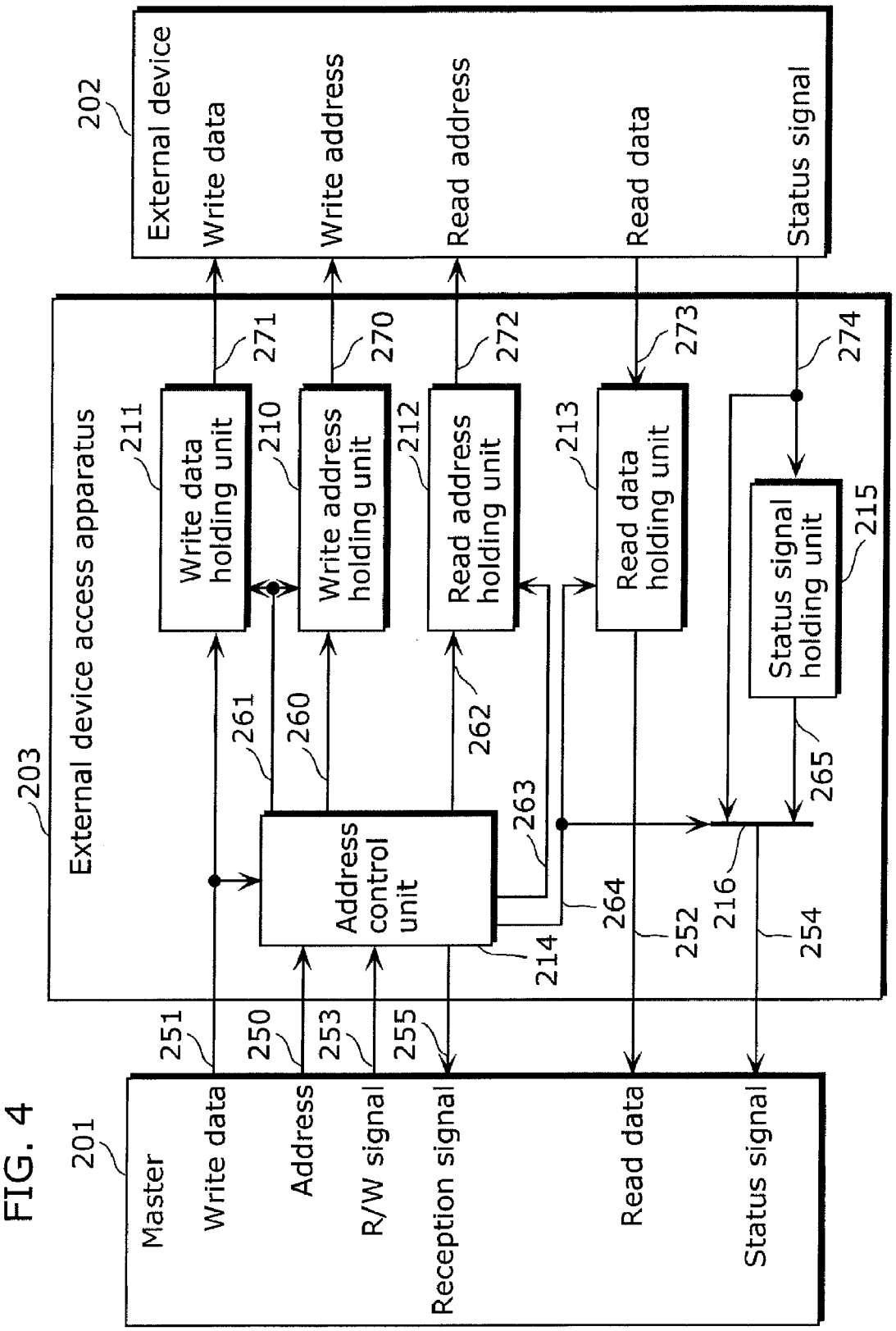
FIG. 4 is a block diagram showing a configuration of an external device access apparatus according to a second embodiment.

FIG. 4 is a diagram showing a configuration of the external device access apparatus according to the second embodiment of the present invention.

First, a configuration of an external device access apparatus 203 shall be described.

The external device access apparatus 203 is connected with a master 201 via: an address bus 250; a write data input bus 251; a read data output bus 252; an R/W signal input bus 253; a status signal output bus 254; and a reception signal 255, and is also connected with an external device 202 via: a write address output bus 270; a write data output bus 271; a read address output bus 272; a read data input bus 273; and a status signal input bus 274.

Further, the external device access apparatus 203 includes a write address holding unit 210, a write data holding unit 211, a read address holding unit 212, a read data holding unit 213, and an address control unit 214, a status signal holding unit 215, and a selector 216.

The write address holding unit 210 receives a write address 260 and a write permission signal 261 from the address control unit 214, and outputs the held address to the external device 202.

The write data holding unit 211 receives write data from the master via the write data input bus 251 and the write permission signal 261 from the address control unit 214, and outputs the held data to the external device 202.

The read address holding unit 212 receives a read address 262 and a read address permission signal 263 from the address control unit 214, and outputs the held address to the external device 202.

The read data holding unit 213 receives read data from the external device via the read data input bus 273 and a read data permission signal 264 from the address control unit 214, and outputs the held data to the master 201.

Further, the read data holding unit 213 has an address assigned to the access space of the master 201.

The address control unit 214: receives an address from the master via the address bus 250, an R/W signal from the master via the R/W signal bus 253, and the write data from the master via the write data input bus 251; outputs the write address 260 and the write permission signal 261 to the write address holding unit 210; outputs the write permission signal 261 to the write data holding unit 211; outputs the read address 262 and the read address permission signal 263 to the read address holding unit 212, and outputs the read data permission signal 264 to the read data holding unit 213.

The status signal holding unit 215 receives a status signal from the external device via the status signal input bus 274, and outputs the held signal to the selector 216.

The selector 216 selects a status signal inputted via the status signal input bus 274 and the status signal held in the status signal holding unit 215 based on the read data permission signal 264 so as to output to the master 201 via the status signal output bus 254.

Next, operations of the external device access apparatus 203 shall be described. The operations include a usual write operation, a prefetch operation, and a prefetched data read operation, as in the description of the first embodiment.

In the usual write operation, in response to a write request from the master 201, the address received via the address bus 250 and the R/W signal received via the R/W signal bus 253 are inputted to the address control unit 214 in the external device access apparatus 203.

Based on the R/W signal and on the basis that the address received via the address bus 250 is not an address assigned to the read data holding unit 213, the address control unit 214: recognizes the usual write operation; outputs the write address 260 and the write permission signal 261 to the write address holding unit 210 so that the address is held; and outputs the write permission signal 261 to the write data holding unit 211 so that the data received via the write data bus 251 is held.

The held address and data are kept until the external device 202 accepts them, and when the acceptance is completed, the usual write operation is completed.

Further, when this operation is carried out, a status of the external device 202, as a status signal, is selected by the selector 216 and is directly outputted to the master 201.

The prefetch operation, in response to the write request from the master 201, the address received via the address bus 250, the R/W signal received via the R/W signal bus 253, and the data received via the write data bus 251 are inputted to the address control unit 214 in the external device access apparatus 203.

Based on the R/W signal and on the basis that the address received via the address bus 250 is an address assigned to the read data holding unit 213, the address control unit 214 recognizes the prefetch operation, outputs the read address 262 and the read address permission signal 263 to the read address holding unit 212 so that the address is held, considering the data received via the write data bus 251 as the read address.

The external device accepts the held address and holds the address until the read data from the external device 202 is held in the read data holding unit 213. When this hold is completed, the prefetch operation is completed.

Further, when this operation is carried out, a status of the external device 202 is held in the status signal holding unit 215 as a status signal.

In the prefetched data read operation, in response to the read request from the master 201, the address received via the address bus 250 and the R/W signal received via the R/W signal bus 253 are inputted to the address control unit 214 in the external device access apparatus 203.

Based on the R/W signal and on the basis that the address received via the address bus 250 is an address assigned to the read data holding unit 213, the address control unit 214 recognizes the prefetched data read operation, and outputs the read data permission signal 264 to the read data holding unit 213 so as to output to the master 201 via the read data bus 252.

Further, when this operation is carried out, the status signal held in the status signal holding unit 215 is selected by the selector 216, and is outputted to the master 201.

An advantage of these operations is that in the usual write operation, in addition to the advantage described in the first embodiment, the status of the external device 202 can be sent to the master 201.

In the prefetch operation, in addition to the advantage described in the first embodiment, the status of the external device 202 at the time of prefetching can be held by the status signal holding unit 215.

In the prefetched data read operation, in addition to the advantage described in the first embodiment, the status of the external device 202 at the completion of the prefetch operation held by the status signal holding unit 215 can be sent to the master 201.

Third Embodiment

With reference to the drawings, an external device access apparatus according to a third embodiment of the present invention shall be described.

Figure 5:
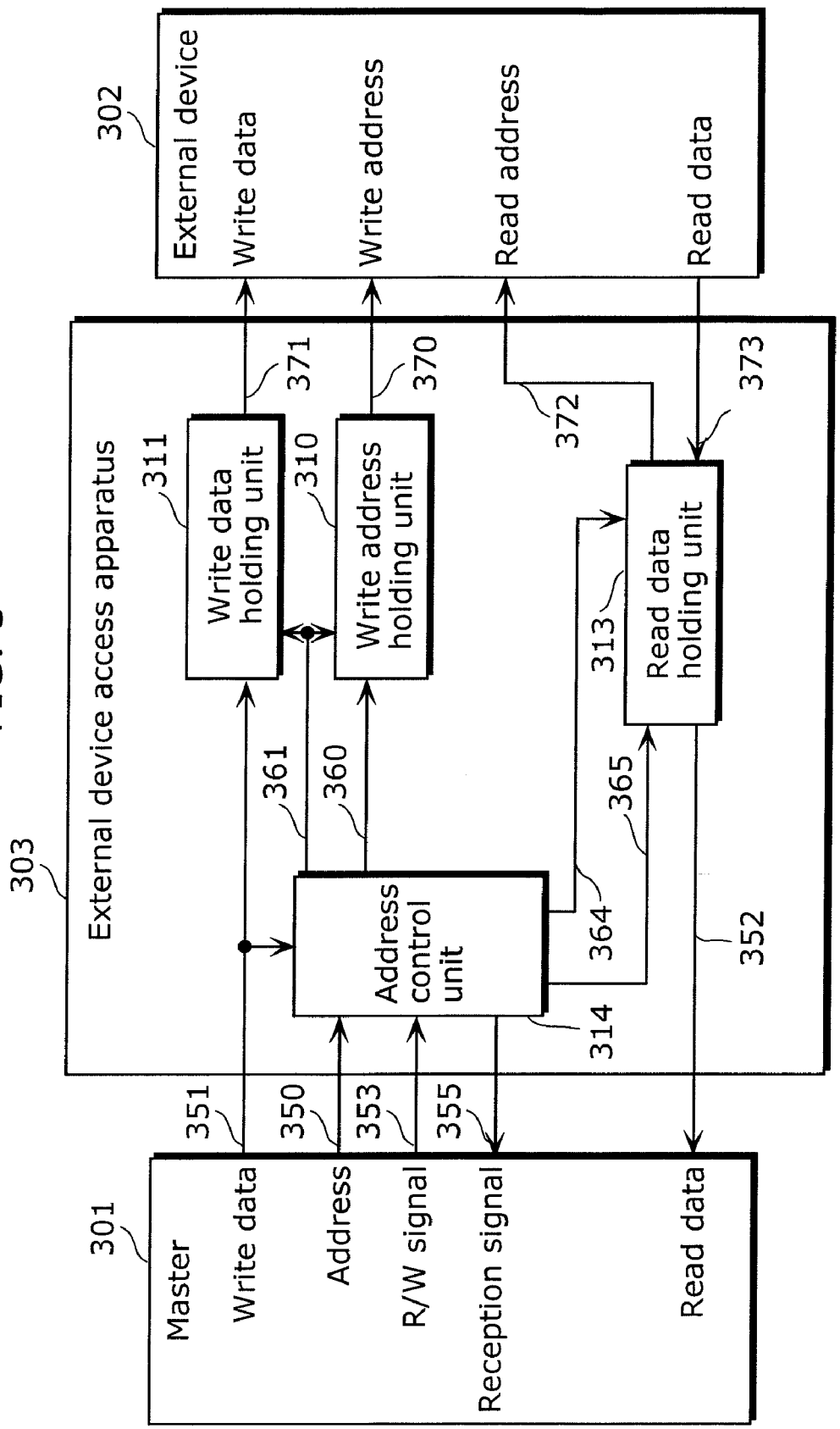
FIG. 5 is a block diagram showing a configuration of an external device access apparatus according to a third embodiment.

FIG. 5 is a diagram showing a configuration of the external device access apparatus according to the third embodiment of the present invention.

First, a configuration of an external device access apparatus 303 shall be described.

The external device access apparatus 303 is connected with a master 301 via: an address bus 350; a write data input bus 351; a read data output bus 352; an R/W signal input bus 353; and a reception signal 355, and is also connected with an external device 302 via: a write address output bus 370; a write data output bus 371; a read address output bus 372; and a read data input bus 373.

Further, the external device access apparatus 303 includes a write address holding unit 310, a write data holding unit 311, a read data holding unit 313, and an address control unit 314.

The write address holding unit 310 receives a write address 360 and a write permission signal 361 from the address control unit 314, and outputs the held address to the external device 302.

The write data holding unit 311 receives write data from the master via the write data input bus 351 and the write permission signal 361 from the address control unit 314, and outputs the held data to the external device 302.

The read data holding unit 313 receives a read address 365 and a read address permission signal, and outputs the held address to the external device 302. From the read address, read data received from the external device via the read data input bus 373, and read data holding unit control 364 received from the address control unit are held, and the held data is outputted to the master 301.

Further, the read data holding unit 313 has an address assigned to the access space of the master 301.

The address control unit 314: receives an address from the master via the address bus 350, an R/W signal from the master via the R/W signal bus 353, and the write data from the master via the write data input bus 351; outputs the write address 360 and the write permission signal 361 to the write address holding unit 310; outputs the write permission signal 361 to the write data holding unit 311; and outputs the read address 365 and the read data holding unit control 364 to the read data holding unit 313.

Next, operations of the external device access apparatus 303 shall be described. The operations include a usual write operation, a prefetch operation, and a prefetched data read operation, as in the description of the first embodiment.

In the usual write operation, in response to a write request from the master 301, the address received via the address bus 350 and the R/W signal received via the R/W signal bus 353 are inputted to the address control unit 314 in the external device access apparatus 303.

Based on the R/W signal and on the basis that the address received via the address bus 350 is not an address assigned to the read data holding unit 313, the address control unit 314: recognizes the usual write operation, outputs the write address 360 and the write permission signal 361 to the write address holding unit 310 so that the address is held; and outputs the write permission signal 361 to the write data holding unit 311 so that the data received via the write data bus 351 is held.

The held address and data are kept until the external device 302 accepts them, and when the acceptance is completed, the usual write operation is completed.

In the prefetch operation, in response to the write request from the master 301, the address received via the address bus 350, the R/W signal received via the R/W signal bus 353, and the data received via the write data bus 351 are inputted to the address control unit 314 in the external device access apparatus 303.

Based on the R/W signal and on the basis that the address received via the address bus 350 is an address assigned to the read data holding unit 313, the address control unit 314 recognizes the prefetch operation, outputs the read address 365 and the read data holding unit control 364 to the read data holding unit 313 so that the address is held, considering the data received via the write data bus 351 as the read address. The external device accepts the held address, and holds the address until the read data received from the external device 302 is held in the read data holding unit 313. When this hold is completed, the prefetch operation is completed.

In the prefetched data read operation, in response to the read request from the master 301, the address received via the address bus 350 and the R/W signal received via the R/W signal bus 353 are inputted to the address control unit 314 in the external device access apparatus 303.

Based on the R/W signal and on the basis that the address received via the address bus 350 is an address assigned to the read data holding unit 313, the address control unit 314 recognizes the prefetched data read operation, and outputs the read data holding unit control 364 to the read data holding unit 313 so as to output to the master 301 via the read data bus 352.

The read data is held until the master 301 accepts the read data, and when the acceptance is completed, the prefetched data read operation is completed.

An advantage of these operations is that in the prefetch operation, in addition to the advantages described in the first and the second embodiments, by providing the read data holding unit control 364, the prefetch operation can be realized by the read data holding unit 313 only, and thus it is possible to restrain an increase of the area of the external device access apparatus.

Fourth Embodiment

With reference to the drawings, an external device access apparatus according to a fourth embodiment of the present invention shall be described.

Figure 6:
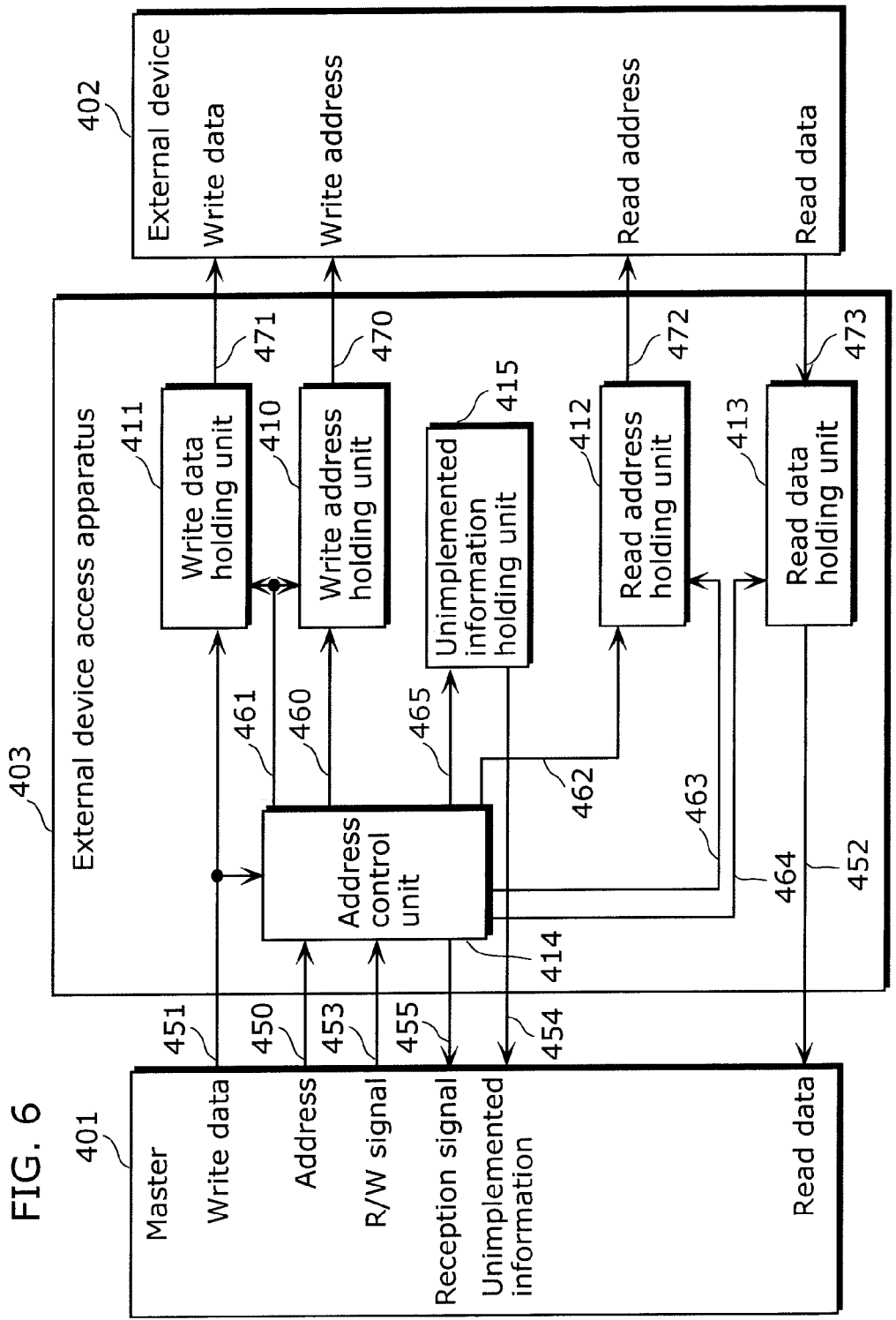
FIG. 6 is a block diagram showing a configuration of an external device access apparatus according to a fourth embodiment.

FIG. 6 is a diagram showing a configuration of the external device access apparatus according to the fourth embodiment of the present invention.

First, a configuration of an external device access apparatus 403 shall be described.

The external device access apparatus 403 is connected with a master 401 via: an address bus 450; a write data input bus 451; a read data output bus 452; an R/W signal input bus 453; an unimplemented information bus 454; and a reception signal 455, and is also connected with an external device 402 via: a write address output bus 470; a write data output bus 471; a read address output bus 472; and a read data input bus 473.

Further, the external device access apparatus 403 includes a write address holding unit 410, a write data holding unit 411, a read address holding unit 412, a read data holding unit 413, an address control unit 414, and an unimplemented information holding unit 415.

The write address holding unit 410 receives a write address 460 and a write permission signal 461 from the address control unit 414, and outputs the held address to the external device 402.

The write data holding unit 411 receives write data from the master via the write data input bus 451 and the write permission signal 461 from the address control unit 414, and outputs the held data to the external device 402.

The read address holding unit 412 receives a read address 462 and a read address permission signal 463 from the address control unit 414, and outputs the held address to the external device 402.

The read data holding unit 413 receives read data from the external device via the read data input bus 473 and a read data permission signal 464 from the address control unit, and outputs the held data to the master 401.

Further, the read data holding unit 413 has an address assigned to the access space of the master 401.

The address control unit 414: receives an address from the master via the address bus 450, an R/W signal from the master via the R/W signal bus 453, and the write data from the master via the write data input bus 451; outputs the write address 460 and the write permission signal 461 to the write address holding unit 410; outputs the write permission signal 461 to the write data holding unit 411; outputs the read address 462 and the read address permission signal 463 to the read address holding unit 412; outputs the read data permission signal 464 to the read data holding unit 413; and outputs unimplemented information 465 to the unimplemented information holding unit 415.

The unimplemented information holding unit 415 receives the unimplemented information 465 from the address control unit 414, and outputs the held unimplemented information to the master 401 via the unimplemented information bus 454.

Next, operations of the external device access apparatus 403 shall be described. The operations include a usual write operation, a prefetch operation, and a prefetched data read operation, as in the description of the first embodiment.

In the usual write operation, in response to a write request from the master 401, the address received via the address bus 450 and the R/W signal received via the R/W signal bus 453 are inputted to the address control unit 414 in the external device access apparatus 403.

Based on the R/W signal and in the case where the address received via the address bus 450 is not an address assigned to the read data holding unit 413, the address control unit 414: recognizes the usual write operation; outputs the write address 460 and the write permission signal 461 to the write address holding unit 410 so that the address is held; and outputs the write permission signal 461 to the write data holding unit 411 so that the data received via the write data bus 451 is held. In the case where the address received via the address bus 450 is an address of an external device which is not implemented, the external device is recognized as unimplemented, and the unimplemented information 465 is held in the unimplemented information holding unit 415.

In the case where the address and data are held, the held address and data are kept until the external device 402 accepts them, and when the acceptance is completed, the usual write operation is completed. In the case where the unimplemented information is held, the unimplemented information is kept until the master 401 accepts it, and when the acceptance is completed, the usual write operation is completed.

In the prefetch operation, in response to the write request from the master 401, the address received via the address bus 450, the R/W signal received via the R/W signal bus 453, and the data received via the write data bus 451 are inputted to the address control unit 414 in the external device access apparatus 403.

Based on the R/W signal and in the case where the address received via the address bus 450 is an address assigned to the read data holding unit 413, the address control unit 414: recognizes the prefetch operation; outputs the read address 462 and the read address permission signal 463 to the read address holding unit 412 so that the address is held, considering the data received via the write data bus 451 as the read address. In the case where the address received via the address bus 450 is an address of an external device which is not implemented, or in the case where the address, as which the data received via the write data bus 451 is considered, is an address of an external device which is not implemented, the external device is recognized as unimplemented, and the unimplemented information 465 is held in the unimplemented information holding unit 415.

In the case where the address is held, the external device accepts the held address and holds it until the read data received from the external device 402 is held in the read data holding unit 413. When the hold is completed, the prefetch operation is completed. In the case where the unimplemented information is held, the unimplemented information is kept until the master 401 accepts it, and when the acceptance is completed, the prefetch operation is completed.

In the prefetched data read operation, in response to the read request from the master 401, the address received via the address bus 450 and the R/W signal received via the R/W signal bus 453 are inputted to the address control unit 414 in the external device access apparatus 403.

Based on the R/W signal and in the case where the address received via the address bus 450 is an address assigned to the read data holding unit 413, the address control unit 414 recognizes the prefetched data read operation, and outputs the read data permission signal 464 to the read data holding unit 413 so as to output to the master 401 via the read data bus 452. In the case where the address received via the address bus 450 is an address of an external device which is not implemented, the external device is recognized as unimplemented, and the unimplemented information 465 is held in the unimplemented information holding unit 415.

In the case where the address is held, the read data is held until the master 401 accepts the read data, and when the acceptance is completed, the prefetched data read operation is completed. In the case where the unimplemented information is held, the unimplemented information is kept until the master 401 accepts it, and when the acceptance is completed, the prefetched data read operation is completed.

An advantage of these operations is that in the usual write operation, in addition to the advantage described in the first embodiment, by judging whether or not the external device, the address of which is specified by the master 401, is implemented, and sending the result of the judgment as unimplemented information, it is possible to easily set implementation or unimplementation of the external device 402 without being dependent on the master 401.

In the prefetch operation, in addition to the advantages described in the first embodiment, by judging whether or not the external device, the data and the address of which are specified by the master 401, is implemented, and sending the result of the judgment as unimplemented information, it is possible to easily set implementation or unimplementation of the external device, the address of which is to be assigned to the external device 402 and to the read data holding unit 413, without being dependent on the master 401.

In the prefetched data read operation, in addition to the advantages described in the first embodiment, by judging whether or not the external device, the address of which is specified by the master 401, is implemented, and sending the result of the judgment as unimplemented information, it is possible to easily set implementation or unimplementation of the external device, the address of which is to be assigned to the read data holding unit 413, without being dependent on the master 401.

Fifth Embodiment

With reference to the drawings, an external device access apparatus according to a fifth embodiment of the present invention shall be described.

Figure 7:
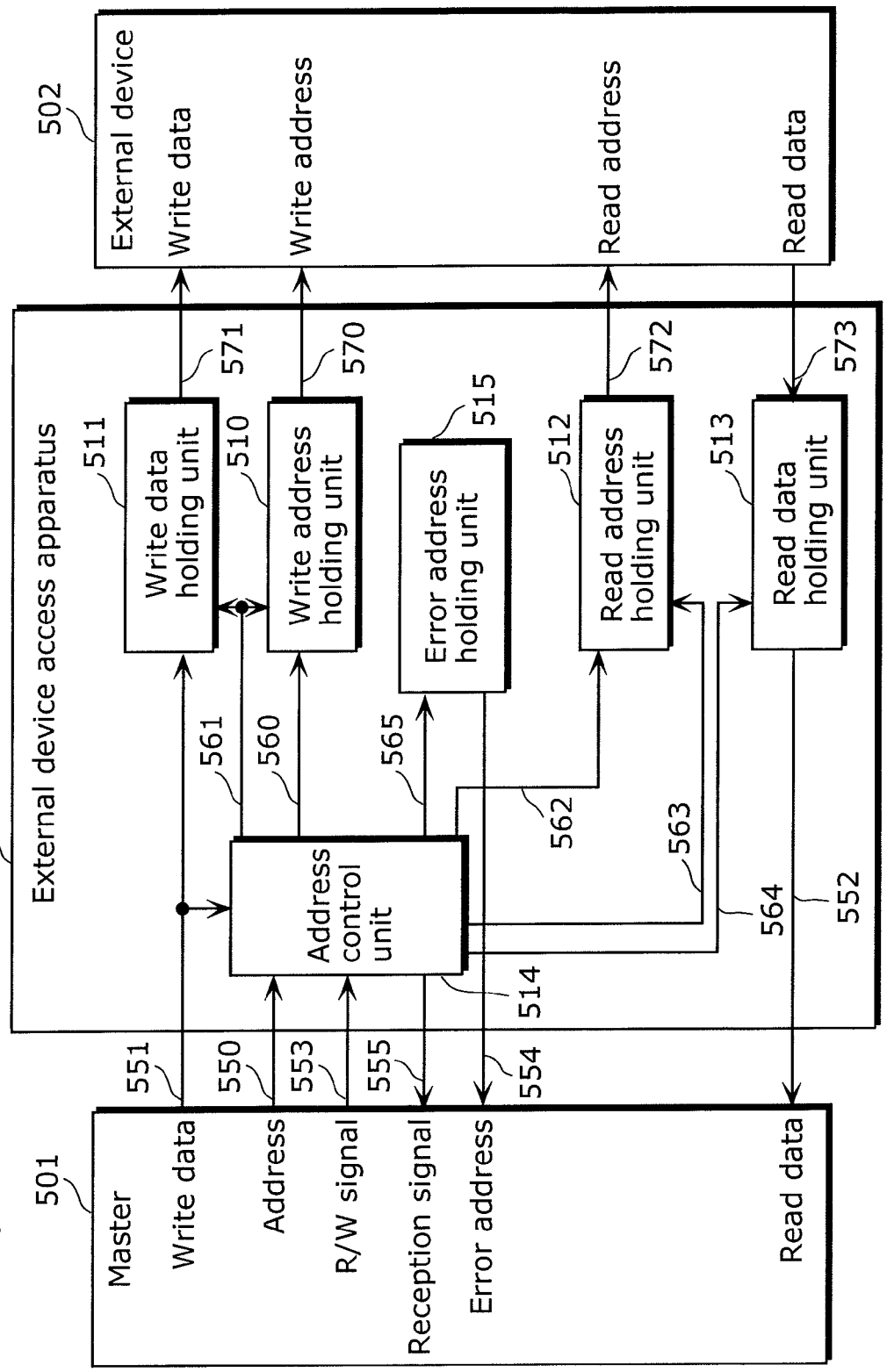
FIG. 7 is a block diagram showing a configuration of an external device access apparatus according to a fifth embodiment.

FIG. 7 is a diagram showing a configuration of the external device access apparatus according to the fifth embodiment of the present invention.

First, a configuration of an external device access apparatus 503 shall be described.

The external device access apparatus 503 is connected with a master 501 via: an address bus 550; a write data input bus 551; a read data output bus 552; an R/W signal input bus 553; an error address bus 554; and a reception signal 555, and is also connected with an external device 502 via: a write address output bus 570; a write data output bus 571; a read address output bus 572; and a read data input bus 573.

Further, the external device access apparatus 503 includes a write address holding unit 510, a write data holding unit 511, a read address holding unit 512, a read data holding unit 513, an address control unit 514, and an error address holding unit 515.

The write address holding unit 510 receives a write address 560 and a write permission signal 561 from the address control unit 514, and outputs the held address to the external device 502.

The write data holding unit 511 receives write data from the master via the write data input bus 551 and the write permission signal 561 from the address control unit 514, and outputs the held data to the external device 502.

The read address holding unit 512 receives a read address 562 and a read address permission signal 563 from the address control unit 514, and outputs the held address to the external device 502.

The read data holding unit 513 receives read data from the external device via the read data input bus 573 and a read data permission signal 564 from the address control unit, and outputs the held data to the master 501.

Further, the read data holding unit 513 has an address assigned to the access space of the master 501.

The address control unit 514: receives an address from the master via the address bus 550, an R/W signal from the master via the R/W signal bus 553, and the write data from the master via the write data input bus 551; outputs the write address 560 and the write permission signal 561 to the write address holding unit 510; outputs the write permission signal 561 to the write data holding unit 511; outputs the read address 562 and the read address permission signal 563 to the read address holding unit 512; outputs the read data permission signal 564 to the read data holding unit 513; and outputs the error address 565 to the error address holding unit 515.

The error address holding unit 515 receives the error address 565 from the address control unit 514, and outputs the held error address to the master 501 via the error address bus 554.

Next, operations of the external device access apparatus 503 shall be described. The operations include a usual write operation, a prefetch operation, and a prefetched data read operation, as in the description of the first embodiment.

In the usual write operation, in response to a write request from the master 501, the address received via the address bus 550 and the R/W signal received via the R/W signal bus 553 are inputted to the address control unit 514 in the external device access apparatus 503.

Based on the R/W signal and in the case where the address received via the address bus 550 is not an address assigned to the read data holding unit 513, the address control unit 514:

recognizes the usual write operation; outputs the write address 560 and the write permission signal 561 to the write address holding unit 510 so that the address is held; and outputs the write permission signal 561 to the write data holding unit 511 so that the data received via the write data bus 551 is held. In the case where the address received via the address bus 550 is an address of an external device which is not implemented, the external device is recognized as unimplemented and the address is held in the error address holding unit 515 as the error address 565.

In the case where the address and data are held, the held address and data are kept until the external device 502 accepts them. When the acceptance is completed, the usual write operation is completed. In the case where the error address is held, the held error address is kept until the master 501 accepts it. When the acceptance is completed, the usual write operation is completed.

In the prefetch operation, in response to the write request from the master 501, the address received via the address bus 550, the R/W signal received via the R/W signal bus 553, and the data received via the write data bus 551 are inputted to the address control unit 514 in the external device access apparatus 503.

Based on the R/W signal and in the case where the address received via the address bus 550 is an address assigned to the read data holding unit 513, the address control unit 514 recognizes the prefetch operation, outputs the read address 562 and the read address permission signal 563 to the read address holding unit 512 so that the address is held, considering the data received via the write data bus 551 as the read address. In the case where the address received via the address bus 550 is an address of an external device which is not implemented, or in the case where the address, as which the data received via the write data bus 551 is considered, is an address of an external device which is not implemented, the external device is recognized as unimplemented and the address is held in the error address holding unit 515 as the error address 565.

In the case where the address is held, the external device accepts the held address and holds it until the read data received from the external device 502 is held in the read data holding unit 513. When the hold is completed, the prefetch operation is completed. In the case where the error address is held, the held error address is kept until the master 501 accepts it. When the acceptance is completed, the prefetch operation is completed.

In the prefetched data read operation, in response to the read request from the master 501, the address received via the address bus 550 and the R/W signal received via the R/W signal bus 553 are inputted to the address control unit 514 in the external device access apparatus 503.

Based on the R/W signal and in the case where the address received via the address bus 550 is an address assigned to the read data holding unit 513, the address control unit 514 recognizes the prefetched data read operation, and outputs the read data permission signal 564 to the read data holding unit 513 so as to output to the master 501 via the read data bus 552. In the case where the address received via the address bus 550 is an address of an external device which is not implemented, the external device is recognized as unimplemented and the address is held in the error address holding unit 515 as the error address 565.

In the case where the address is held, the read data is held until the master 501 accepts the read data. When the acceptance is completed, the prefetched data read operation is completed. In the case where the error address is held, the held error address is kept until the master 501 accepts it. When the acceptance is completed, the prefetched data read operation is completed.

An advantage of these operations is that in the usual write operation, in addition to the advantage described in the first embodiment, by judging whether or not the external device, the address of which is specified by the master 501, is implemented, and sending the result of the judgment as the error address, the master 501 can easily notice the error address, and this is useful when debugging, for example.

In the prefetch operation, in addition to the advantages described in the first embodiment, by judging whether or not the external device, the data and the address of which are specified by the master 501, are implemented, and sending the result of the judgment as the error address, the master 501 can easily notice the error address, and this is useful when debugging, for example.

In the prefetched data read operation, in addition to the advantages described in the first embodiment, by judging whether or not the external device, the address of which is specified by the master 501, is implemented, and sending the result of the judgment as the error address, the master 501 can easily notice the error address, and this is useful when debugging, for example.

Sixth Embodiment

With reference to the drawings, an external device access apparatus according to a sixth embodiment of the present invention shall be described.

Figure 8:
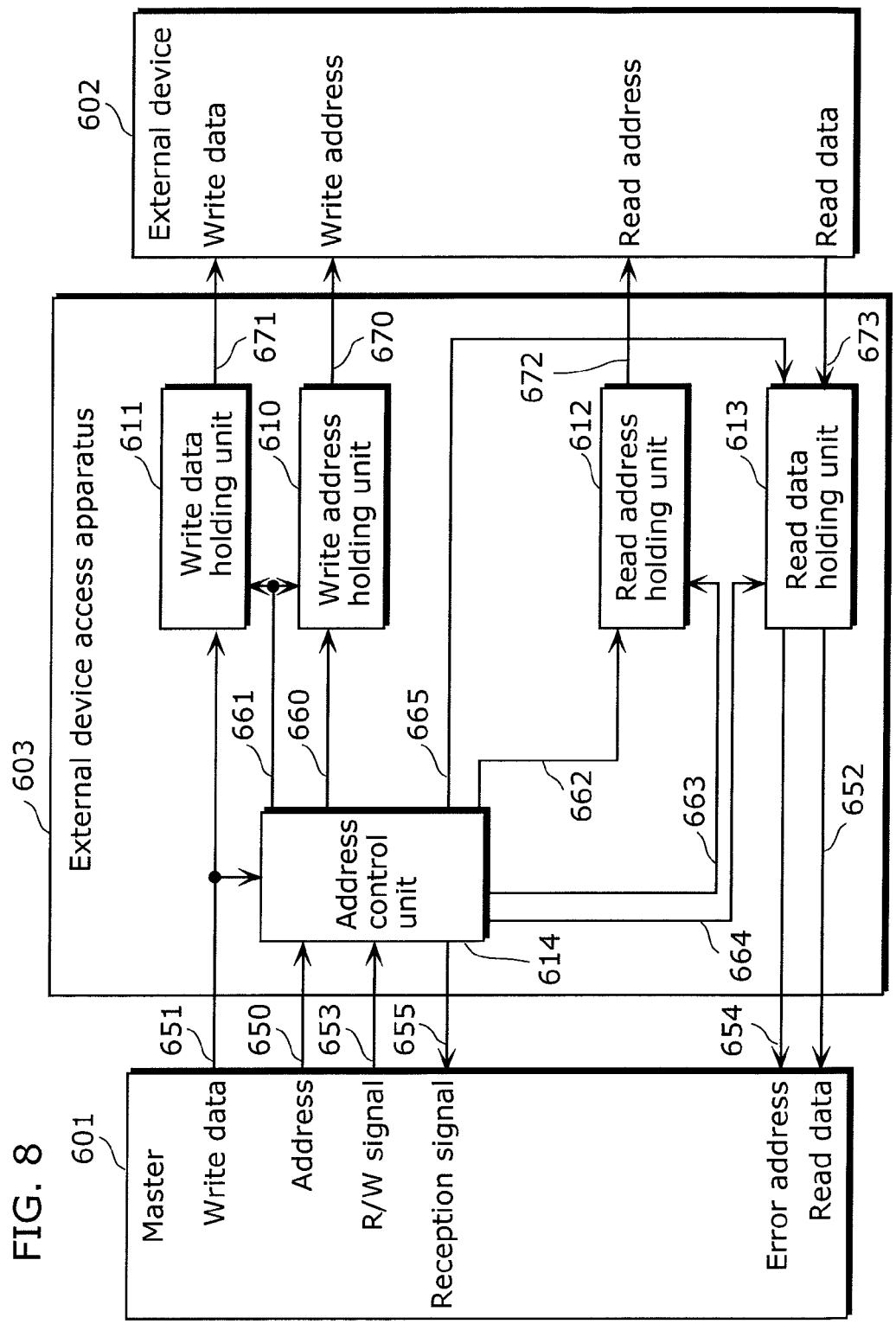
FIG. 8 is a block diagram showing a configuration of an external device access apparatus according to a sixth embodiment.

FIG. 8 is a diagram showing a configuration of the external device access apparatus according to the sixth embodiment of the present invention.

First, a configuration of an external device access apparatus 603 shall be described.

The external device access apparatus 603 is connected with a master 601 via: an address bus 650; a write data input bus 651; a read data output bus 652; an R/W signal input bus 653; and an error address bus 654, and is also connected with an external device 602 via: a write address output bus 670; a write data output bus 671; a read address output bus 672; and a read data input bus 673.

Further, the external device access apparatus 603 includes a write address holding unit 610, a write data holding unit 611, a read address holding unit 612, a read data holding unit 613, and an address control unit 614.

The write address holding unit 610 receives a write address 660 and a write permission signal 661 from the address control unit 614, and outputs the held address to the external device 602.

The write data holding unit 611 receives the write data from the master via the write data input bus 651 and the write permission signal 661 from the address control unit 614, and outputs the held data to the external device 602.

The read address holding unit 612 receives a read address 662 and a read address permission signal 663 from the address control unit 614, and outputs the held address to the external device 602.

The read data holding unit 613 receives: read data from the external device via the read data input bus 673; a read data holding unit control 664 from the address control unit; and an error address 665 from the address control unit, and outputs the held data or error address to the master 601.

Further, the read data holding unit 613 has an address assigned to the access space of the master 601.

The address control unit 614: receives an address from the master via the address bus 650, an R/W signal from the master via the R/W signal bus 653, and the write data from the master via the write data input bus 651; outputs the write address 660 and the write permission signal 661 to the write address holding unit 610; outputs the write permission signal 661 to the write data holding unit 611; outputs the read address 662 and the read address permission signal 663 to the read address holding unit 612; outputs the read data holding unit control 664 to the read data holding unit 613; and outputs the error address 665 to the read data holding unit 613.

Next, operations of the external device access apparatus 603 shall be described. The operations include a usual write operation, a prefetch operation, and a prefetched data read operation, as in the description of the first embodiment.

In the usual write operation, in response to a write request from the master 601, the address received via the address bus 650 and the R/W signal received via the R/W signal bus 653 are inputted to the address control unit 614 in the external device access apparatus 603.

Based on the R/W signal and in the case where the address received via the address bus 650 is not an address assigned to the read data holding unit 613, the address control unit 614: recognizes the usual write operation; outputs the write address 660 and the write permission signal 661 to the write address holding unit 610 so that the address is held; and outputs the write permission signal 661 to the write data holding unit 611 so that the data received via the write data bus 651 is held. In the case where the address received via the address bus 650 is an address of an external device which is not implemented, the external device is recognized as unimplemented and the address is held in the read data holding unit 613.

In the case where the address and data are held, the held address and data are kept until the external device 602 accepts them. When the acceptance is completed, the usual write operation is completed. In the case where the error address is held, the held error address is kept until the master 601 accepts it. When the acceptance is completed, the usual write operation is completed.

In the prefetch operation, in response to a write request from the master 601, the address received via the address bus 650, the R/W signal received via the R/W signal bus 653, and the data received via the write data bus 651 are inputted to the address control unit 614 in the external device access apparatus 603.

Based on the R/W signal and in the case where the address received via the address bus 650 is an address assigned to the read data holding unit 613, the address control unit 614 recognizes the prefetch operation, and outputs the read address 662 and the read address permission signal 663 to the read address holding unit 612 so that the address is held, considering the data received via the write data bus 651 as the read address. In the case where the address received via the address bus 650 is an address of an external device which is not implemented, or in the case where the address, as which the data received via the write data bus 651 is considered, is an address of an external device which is not implemented, the external device is recognized as unimplemented and the address is held in the read data holding unit 613 as the error address.

In the case where the address is held, the external device accepts the held address and holds it until the read data received from the external device 602 is held in the read data holding unit 613. When the hold is completed, the prefetch operation is completed. In the case where the error address is held, the held error address is kept until the master 601 accepts it. When the acceptance is completed, the prefetch operation is completed.

In the prefetched data read operation, in response to the read request from the master 601, the address received via the address bus 650 and the R/W signal received via the R/W signal bus 653 are inputted to the address control unit 614 in the external device access apparatus 603.

Based on the R/W signal and in the case where the address received via the address bus 650 is an address assigned to the read data holding unit 613, the address control unit 614 recognizes the prefetched data read operation, and outputs the read data permission signal 664 to the read data holding unit 613 so as to output to the master 601 via the read data bus 652. In the case where the address received via the address bus 650 is an address of an external device which is not implemented, the external device is recognized as unimplemented and the address is held in the read data holding unit 613 as an error address.

In the case where the address is held, the read data is held until the master 601 accepts the read data, and when the acceptance is completed, the prefetched data read operation is completed. In the case where the error address is held, the held error address is kept until the master 601 accepts it, and when the acceptance is completed, the prefetched data read operation is completed.

An advantage of these operations is that in the usual write operation, in addition to the advantages described in the first and the fifth embodiments, since the error address can be sent to the master 601 by the read data holding unit 613 only, it is possible to restrain an increase of the area of the external device access apparatus.

In the prefetch operation, in addition to the advantages described in the first and the fifth embodiments, since the error address can be sent to the master 601 by the read data holding unit 613 only, it is possible to restrain an increase of the area of the external device access apparatus.

In the prefetched data read operation, in addition to the advantages described in the first and the fifth embodiments, since the error address can be sent to the master 601 by the read data holding unit 613 only, it is possible to restrain an increase of the area of the external device access apparatus.

Seventh Embodiment

With reference to the drawings, an external device access apparatus according to a seventh embodiment of the present invention shall be described.

Figure 9:
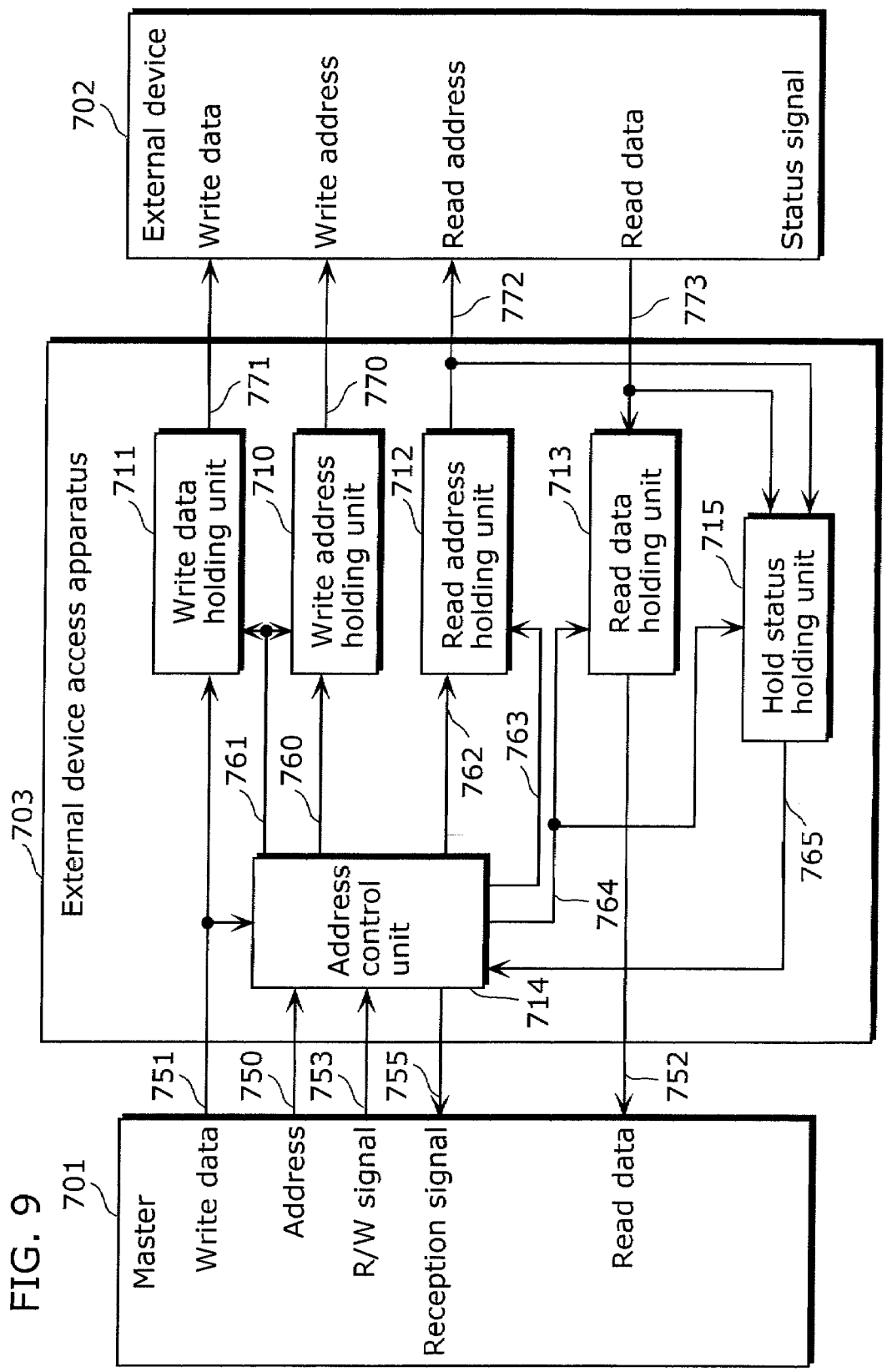
FIG. 9 is a block diagram showing a configuration of an external device access apparatus according to a seventh embodiment.

FIG. 9 is a diagram showing a configuration of the external device access apparatus according to the seventh embodiment of the present invention.

First, a configuration of an external device access apparatus 703 shall be described.

The external device access apparatus 703 is connected with a master 701 via: an address bus 750; a write data input bus 751; a read data output bus 752; and an R/W signal input bus 753, and is also connected with an external device 702 via: a write address output bus 770; a write data output bus 771; a read address output bus 772; and a read data input bus 773.

Further, the external device access apparatus 703 includes a write address holding unit 710, a write data holding unit 711, a read address holding unit 712, a read data holding unit 713, an address control unit 714, and a hold status holding unit 715.

The write address holding unit 710 receives a write address 760 and a write permission signal 761 from the address control unit 714, and outputs the held address to the external device 702.

The write data holding unit 711 receives write data from the master via the write data input bus 751 and the write permission signal 761 from the address control unit 714, and outputs the held data to the external device 702.

The read address holding unit 712 receives a read address 762 and a read address permission signal 763 from the address control unit 714, and outputs the held address to the external device 702.

The read data holding unit 713 receives read data from the external device via the read data input bus 773 and a read data permission signal 764 from the address control unit, and outputs the held data to the master 701.

Further, the read data holding unit 713 has an address assigned to the access space of the master 701.

The address control unit 714: receives an address from the master via the address bus 750, an R/W signal from the master via the R/W signal bus 753, and the write data from the master via the write data input bus 751; outputs the write address 760 and the write permission signal 761 to the write address holding unit 710; outputs the write permission signal 761 to the write data holding unit 711; outputs the read address 762 and the read address permission signal 763 to the read address holding unit 712; and outputs the read data permission signal 764 to the read data holding unit 713 and to the hold status holding unit 715.

The hold status holding unit 715 receives: read data from the external device via the read data input bus 773; an address from the read address holding unit 712; and the read data permission signal 764 from the address control unit 714, and outputs a holding unit status 765 to the address control unit 714.

Next, operations of the external device access apparatus 703 shall be described. The operations include a usual write operation, a prefetch operation, and a prefetched data read operation, as in the description of the first embodiment.

In the usual write operation, in response to a write request from the master 701, the address received via the address bus 750 and the R/W signal received via the R/W signal bus 753 are inputted to the address control unit 714 in the external device access apparatus 703.

Based on the R/W signal and on the basis that the address received via the address bus 750 is not an address assigned to the read data holding unit 713, the address control unit 714: recognizes the usual write operation; outputs the write address 760 and the write permission signal 761 to the write address holding unit 710 so that the address is held; and outputs the write permission signal 761 to the write data holding unit 711 so that the data received via the write data bus 751 is held.

The held address and data are kept until the external device accepts them, and when the acceptance is completed, the usual write operation is completed.

In the prefetch operation, in response to a write request from the master 701, the address received via the address bus 750, the R/W signal received via the R/W signal bus 753, and the data received via the write data bus 751 are inputted to the address control unit 714 in the external device access apparatus 703.

Based on the R/W signal, and on the basis that the address received via the address bus 750 is an address assigned to the read data holding unit 713, the address control unit 714 recognizes the prefetch operation, and outputs the read address 762 and the read address permission signal 763 to the read address holding unit 712 so that the address is held, considering the data received via the write data bus 751 as the read address.

The held address is outputted to the external device 702 and is also outputted to the hold status holding unit 715 so as to indicate that the hold is in operation and so that the status indicating that the hold is in operation is held. The outputted address is accepted and held by the external device 702 until the read data received from the external device 702 is held in the read data holding unit 713. When the hold is completed, the status that the hold is in operation, held by the hold status holding unit 715, is cancelled and the prefetch operation is completed.

In the prefetched data read operation, in response to the read request from the master 701, the address received via the address bus 750 and the R/W signal received via the R/W signal bus 753 are inputted to the address control unit 714 in the external device access apparatus 703.

In the case where the address control unit 714 recognizes that the operation is the prefetched data read operation and that the prefetch operation which has been previously requested by the master 701 is not in operation based on the R/W signal and the hold status 765 received from the hold status holding unit 715 and on the basis that the address received via the address bus 750 is an address assigned to the read data holding unit 713, the address control unit 714 outputs the read data permission signal 764 to the read data holding unit 713 so as to output to the master 701 via the read data bus 752.

The read data is held until the master 701 accepts the read data, and when the acceptance is completed, the prefetched data read operation is completed.

In the case where the operation is the prefetched data read operation and the prefetch operation which has been previously requested by the master 701 is in operation, the external device access apparatus 703 does not accept the prefetched data read operation from the master 701 and makes the master 701 wait.

An advantage of these operations is that in the prefetched data read operation, in addition to the advantages described in the first embodiment, since the prefetched data read operation is not accepted when the prefetch operation which has been previously requested by the master 701 is in operation, it is possible to prevent read of data which is data before the data of the external device 702 is read in advance to the read data holding unit 713 and thus operations can be guaranteed to be in accordance with an instruction order requested by the master 701.

Note that the configuration of the present invention is not limited to the configurations described above. For example, in the second through seventh embodiments, the configuration may include a plurality of external device access apparatuses and a plurality of external devices to correspond to a single master as shown in FIG. 1, or include a single external device access apparatus and a plurality of external devices to correspond to a single master, as shown in FIG. 3. Further, the external device access apparatus may include a plurality of: write address holding units; write data holding units; read address holding units; read data holding units; address control units; status signal holding units; unimplemented information holding units; error address holding units; and hold status holding units.

INDUSTRIAL APPLICABILITY

In relation to access between a master and an external device, the external device access apparatus according to the present invention enables: access which is not dependent on the status of the master; a reduction in access penalty; and a reduction in an impact on the performance of the master, and is useful in system LSIs which include a master and an external device. Further, since the external device can be easily expanded without being dependent on the configuration of the external device with respect to the master, when the master is to be widely used in the system LSIs, there is no need to alter the master, and therefore development costs can be significantly reduced.

The invention claimed is:

1. An external device access apparatus which controls access from a master to an external device, said external device access apparatus comprising:
   a write address holder operable to hold a write address in response to a write request from the master to write to the external device;
   a write data holder operable to hold write data in response to the write request;
   a read address holder operable to hold a read address and which can be accessed from the master;
   a read data holder operable to hold data read from the external device and which can be accessed from the master;
   a status signal holder operable to hold a status signal which is outputted from the external device; and
   a controller operable to control the access to the external device in response to: the write request or a read request from the master; and an address specified by the master,
   wherein, in response to the write request from the master to write to the external device, said controller is operable to:
      hold the write address and the write data from the master in said write address holder and in said write data holder, respectively,
      output a reception signal to the master, and
      write the write data to the external device specified by the write address, and
      when the master holds the read address in said read address holder, said controller is operable to:
         read data from the external device specified by the read address, and
         hold the read data in said read data holder, and
   wherein said controller is further operable to:
      simultaneously write the data held in said write data holder to the external device, and hold the status signal outputted from the external device in said status signal holder, and
      simultaneously read the data from the external device specified by the address held in said read address holder so as to hold the read data in said read data holder, and hold the status signal outputted from the external device in said status signal holder, and
      said status signal holder outputs the held status signal to the master.

2. A system LSI comprising:
   a master;
   an external device access apparatus according to claim 1; and
   an external device which is accessed by said master via said external device access apparatus.

3. An external device access apparatus which controls access from a master to an external device, said external device access apparatus comprising:
   a write address holder operable to hold a write address in response to a write request from the master to write to the external device;
   a write data holder operable to hold write data in response to the write request;
   a read address holder operable to hold a read address and which can be accessed from the master;
   a read data holder operable to hold data read from the external device and which can be accessed from the master;
   an unimplemented information holder operable to hold unimplemented information that indicates whether or not one of the write address and the read address is an address of the external device which is unimplemented; and
   a controller operable to control the access to the external device in response to: the write request or a read request from the master; and an address specified by the master,
   wherein, in response to the write request from the master to write to the external device, said controller is operable to:
      hold the write address and the write data from the master in said write address holder and in said write data holder, respectively,
      output a reception signal to the master, and
      write the write data to the external device specified by the write address, and
      when the master holds the read address in said read address holder, said controller is operable to:
         read data from the external device specified by the read address, and
         hold the read data in said read data holder, and
   wherein said controller is further operable to:
      judge whether or not the external device, specified by one of the write address held in said write address holder and the read address held in said read address holder, is unimplemented;
      hold the unimplemented information in said unimplemented information holder when the external device is judged as unimplemented; and
      notify the master of the unimplemented information.

4. An external device access apparatus which controls access from a master to an external device, said external device access apparatus comprising:
   a write address holder operable to hold a write address in response to a write request from the master to write to the external device;
   a write data holder operable to hold write data in response to the write request;
   a read address holder operable to hold a read address and which can be accessed from the master;
   a read data holder operable to hold data read from the external device and which can be accessed from the master;
   an error address holder operable to hold, as an error address, an address of the external device which is unimplemented; and
   a controller operable to control the access to the external device in response to: the write request or a read request from the master; and an address specified by the master,
   wherein, in response to the write request from the master to write to the external device, said controller is operable to:
      hold the write address and the write data from the master in said write address holder and in said write data holder, respectively,
      output a reception signal to the master, and
      write the write data to the external device specified by the write address, and
      when the master holds the read address in said read address holder, said controller is operable to:
         read data from the external device specified by the read address, and
         hold the read data in said read data holder, and wherein said controller is further operable to:
   judge whether or not the external device, specified by one of the write address held in said write address holder and the read address held in said read address holder, is unimplemented;
   hold, as the error address, the address specifying the external device in said error address holder when the external device is judged as unimplemented; and
   notify the master of the error address.

5. An external device access apparatus which controls access from a master to an external device, said external device access apparatus comprising:
   a write address holder operable to hold a write address in response to a write request from the master to write to the external device;
   a write data holder operable to hold write data in response to the write request;
   a read address holder operable to hold a read address and which can be accessed from the master;
   a read data holder operable to hold data read from the external device and which can be accessed from the master; and
   a controller operable to control the access to the external device in response to: the write request or a read request from the master; and an address specified by the master,
   wherein, in response to the write request from the master to write to the external device, said controller is operable to:
      hold the write address and the write data from the master in said write address holder and in said write data holder, respectively,
      output a reception signal to the master, and
      write the write data to the external device specified by the write address, and
      when the master holds the read address in said read address holder, said controller is operable to:
         read data from the external device specified by the read address, and
         hold the read data in said read data holder, and
   wherein said controller is further operable to:
      judge whether or not the external device, specified by one of the write address held in said write address holder and the read address held in said read address holder, is unimplemented;
      hold, as an error address, the address specifying the external device in said read data holder when the external device is judged as unimplemented; and
      notify the master of the error address.

6. An external device access apparatus which controls access from a master to an external device, said external device access apparatus comprising:
   a write address holder operable to hold a write address in response to a write request from the master to write to the external device;
   a write data holder operable to hold write data in response to the write request;
   a read address holder operable to hold a read address and which can be accessed from the master;
   a read data holder operable to hold data read from the external device and which can be accessed from the master;
   a hold status holder operable to hold a hold status signal that indicates whether or not data read from the external device to said read data holder is completed, in response to the write request from the master; and
   a controller operable to control the access to the external device in response to: the write request or a read request from the master; and an address specified by the master,
   wherein, in response to the write request from the master to write to the external device, said controller is operable to:
      hold the write address and the write data from the master in said write address holder and in said write data holder, respectively,
      output a reception signal to the master, and
      write the write data to the external device specified by the write address, and
      when the master holds the read address in said read address holder, said controller is operable to:
         read data from the external device specified by the read address, and
         hold the read data in said read data holder, and
   wherein said controller is further operable to restrict write from the master to said read address holder, based on the hold status signal.

* * * * *